United States Patent
Eguchi et al.

(10) Patent No.: US 7,872,956 B2
(45) Date of Patent: Jan. 18, 2011

(54) OPTICAL-DISC DRIVE APPARATUS AND METHOD OF DECIDING OPTIMUM RECORDING POWERS OF LASER BEAM

(75) Inventors: Hideharu Eguchi, Yokosuka (JP); Yasuhiko Teranishi, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 1025 days.

(21) Appl. No.: 11/315,349

(22) Filed: Dec. 23, 2005

(65) Prior Publication Data

US 2006/0153035 A1 Jul. 13, 2006

(30) Foreign Application Priority Data

Jan. 12, 2005 (JP) ............................. 2005-004670
Nov. 16, 2005 (JP) ............................. 2005-331254

(51) Int. Cl.
*G11B 7/00* (2006.01)
(52) U.S. Cl. .................................................. 369/47.53
(58) Field of Classification Search .............. 369/47.53, 369/47.5, 53.1, 13.26
See application file for complete search history.

(56) References Cited

U.S. PATENT DOCUMENTS

| 6,850,469 | B2 * | 2/2005 | Ogawa et al. ............ 369/47.22 |
| 6,952,382 | B2 * | 10/2005 | Nishiuchi ................ 369/44.29 |
| 2002/0122362 | A1 * | 9/2002 | Fukumoto et al. ........ 369/44.29 |
| 2004/0120241 | A1 * | 6/2004 | Kobayashi et al. ............ 369/94 |
| 2005/0226133 | A1 * | 10/2005 | Ueki ........................ 369/275.3 |
| 2005/0276188 | A1 * | 12/2005 | Lee et al. ................. 369/47.53 |
| 2006/0126463 | A1 * | 6/2006 | Nakao et al. ............... 369/47.5 |
| 2007/0159942 | A1 | 7/2007 | Takeshita et al. |

FOREIGN PATENT DOCUMENTS

| CN | 1819037 | 8/2006 |
| JP | 11-003550 | 1/1999 |
| JP | 2000-311346 | 11/2000 |
| JP | 2003-346339 | 12/2003 |
| JP | 2004-199840 | 7/2004 |
| JP | 2005-259257 | 9/2005 |
| JP | 2005259257 | * 9/2005 |
| JP | 2005-285254 | 10/2005 |

* cited by examiner

*Primary Examiner*—Wayne R Young
*Assistant Examiner*—Aneeta Yodichkas
(74) *Attorney, Agent, or Firm*—Louis Woo

(57) ABSTRACT

In cases where forthcoming recording of information on a multi-layer optical disc is first time one, test signals are recorded on trial write areas in first and second recording layers before being reproduced. First-time optimum recording powers of the laser beam for the respective first and second recording layers are decided in response to the reproduced test signals. In cases where forthcoming recording is not first time one, the test signals are recorded on only the trial write area in the first recording layer before being reproduced. A new optimum recording power for the first recording layer is described in response to the reproduced test signals. Thereafter, a new optimum recording power for the second recording layer is calculated from (1) the new optimum recording power for the first recording layer and (2) the ratio between the first-time optimum recording powers for the first and second recording layers.

6 Claims, 8 Drawing Sheets

OPTICAL-DISC DRIVE APPARATUS AND METHOD OF DECIDING OPTIMUM RECORDING POWERS OF LASER BEAM

BACKGROUND OF THE INVENTION

1. Field of the Invention

This invention relates to an apparatus for driving an optical disc having multiple recording layers. In addition, this invention relates to a method of deciding optimum recording powers of a laser beam applied to an optical disc having multiple recording layers.

2. Description of the Related Art

There are DVDs (digital versatile discs) of various types such as a DVD-R (DVD-recordable), a DVD-RW (DVD-rewritable), and a DVD-RAM. Some DVDs each have a single recording layer while other DVDs each have multiple recording layers.

A two-layer single-sided DVD is an example of the multi-layer DVDs. The two-layer single-sided DVD has a disc substrate whose one side is formed with a laminate of two recording layers. The two recording layers can be optically accessed by a laser beam from one side of the DVD.

Regarding a typical single-layer DVD, optimum power control (OPC) is implemented as follows. To record a signal on the DVD, a recording laser beam modulated in accordance with the signal is applied to the DVD. The quality of the recorded signal on the DVD depends on the power of the recording laser beam applied thereto. The recording layer of the DVD has a power calibration area (PCA). Test recording and reproduction are performed on the DVD before a desired information signal is recorded thereon. During a first stage of the test recording and reproduction, test signals are sequentially recorded on the PCA in the DVD while the power of the recording laser beam is changed among different values. The test signals are assigned to the different powers of the recording laser beam, respectively. During a second stage of the test recording and reproduction, the recorded test signals are reproduced, and the reproduced test signals are evaluated. An optimum power of the recording laser beam is decided on the basis of the results of the evaluation of the reproduced test signals. During the recording of a desired information signal on the DVD which follows the test recording and reproduction, the recording laser beam is controlled at the decided optimum power.

Japanese patent application publication number 11-3550/1999 discloses an apparatus for recording and reproducing information on and from an optical disc having multiple recording layers. In the apparatus of Japanese application 11-3550, a reference recording layer is selected from the multiple recording layers. The non-selected recording layers are called the non-reference recording layers. Test signals each corresponding to a succession of shortest marks are sequentially recorded on a first prescribed radial position in the reference recording layer while the power of a recording laser beam is changed among different values. The test signals are assigned to the different powers of the recording laser beam, respectively. Thereafter, the recorded test signals are reproduced, and the greatest-amplitude one is selected from the reproduced test signals. The recording laser beam power corresponding to the greatest-amplitude reproduced test signal is used as an optimum power of the recording laser beam for the first prescribed radial position in the reference recording layer. Similarly, an optimum power of the recording laser beam is decided for each of second and later prescribed radial positions in the reference recording layer. Furthermore, an optimum power of the recording laser beam is decided for one of the prescribed radial positions in each of the non-reference recording layers. The ratio between the optimum power for the instant prescribed radial position in each of the non-reference recording layers and that for the instant prescribed radial position in the reference recording layer is set as a sensitivity coefficient. Optimum powers of the recording laser beam for the other prescribed radial positions in each of the non-reference recording layers are calculated by multiplying the sensitivity coefficient and the optimum powers for those prescribed radial positions in the reference recording layer.

Japanese patent application publication number 2000-311346 discloses first and second optical discs of different types respectively. The first optical disc has multiple recording layers. Each of the recording layers in the first optical disc has a data area and a trial write area. The second optical disc has multiple recording layers designed so that specified one of the recording layers has both a data area and a trial write area while the other recording layers have data areas only.

Japanese application 2000-311346 also discloses a first apparatus for recording and reproducing information on and from the first optical disc. In the case where information is required to be recorded on selected one of the recording layers of the optical disc, the first apparatus implements trial writing as follows. Test signals are sequentially recorded on the trial write area in the selected recording layer while the power of the recording laser beam is changed among different values. The recorded test signals are reproduced, and the reproduced test signals are compared. An optimum power of the recording laser beam for the selected recording layer is decided on the basis of the result of the comparison.

Japanese application 2000-311346 further discloses a second apparatus for recording and reproducing information on and from the second optical disc. In the case where information is required to be recorded on a recording layer other than the specified one, the second apparatus implements trial writing similarly to the above-mentioned case to decide an optimum recording laser power for the specified recording layer. Then, an optimum recording laser power for the present recording layer (the non-specified recording layer) is calculated from the decided optimum recording laser power for the specified recording layer in response to a predetermined coefficient.

In a two-layer single-sided DVD, the near recording layer is semitransparent while the far recording layer is reflective. During the recording of a signal on the near recording layer, a laser beam is focused thereon. During the recording of a signal on the far recording layer, the recording laser beam is applied thereto through the near recording layer. The application of the recording laser beam to the near recording layer to record a signal thereon changes the physical characteristics (for example, the refractive index and the shape) of the near recording layer from the original. Therefore, during the recording of a signal on the far recording layer, the intensity of the recording laser beam reaching the far recording layer depends on whether or not a portion of the near recording layer through which the recording laser beam passes has undergone signal recording. This fact makes it difficult to accurately decide an optimum power of the recording laser beam for the far recording layer. The previously-mentioned apparatus of Japanese application 11-3550 has a similar problem since the test signals are recorded on the reference recording layer and the non-reference recording layers at the same radial position.

The previously-mentioned first and second apparatuses of Japanese application 2000-311346 have problems as follows.

In the first apparatus of Japanese application 2000-311346, each time information is required to be recorded on selected one of the recording layers of the optical disc, the recording and reproduction of the test signals on and from the trial write area in the selected recording layer is always performed. Therefore, it tends to take a long time to decide an optimum recording laser power for the selected recording layer.

In the second apparatus of Japanese application 2000-311346, an optimum recording laser power for the non-specified recording layer is calculated without performing the recording and reproduction of the test signals on and from the non-specified recording layer. Therefore, the obtained optimum recording laser power for the non-specified recording layer tends to be low in accuracy.

SUMMARY OF THE INVENTION

A general object of this invention is to solve the above-mentioned problems in the prior-art apparatuses.

It is a specific object of this invention to provide an improved apparatus for driving an optical disc having multiple recording layers.

It is another specific object of this invention to provide an improved method of deciding optimum recording powers of a laser beam applied to an optical disc having multiple recording layers.

A first aspect of this invention provides an apparatus for driving an optical disc having at least two recording layers which can be optically accessed by a laser beam from one side of the disc, and which are laminated in a forward direction of the laser beam. The recording layers have trial write areas respectively and include first and second recording layers. The apparatus comprises an optical head for generating the laser beam and applying the generated laser beam to the optical disc, the optical head being closer to the first recording layer than the second recording layer; first means for deciding whether or not forthcoming recording of information on the optical disc is first time one; second means for recording test signals on the trial write areas in the first and second recording layers by use of the optical head and the laser beam with varying powers, and reproducing the recorded test signals from the trial write areas in cases where the first means decides that forthcoming recording of information on the optical disc is first time one; third means for deciding first-time optimum recording powers of the laser beam for the respective first and second recording layers in response to the test signals reproduced by the second means; fourth means for recording the test signals on the trial write area in the first recording layer by use of the optical head and the laser beam with varying powers, and reproducing the recorded test signals from the trial write area in the first recording layer in cases where the first means decides that forthcoming recording of information on the optical disc is not first time one; fifth means for deciding a new optimum recording power of the laser beam for the first recording layer in response to the test signals reproduced by the fourth means; and sixth means for calculating a new optimum recording power of the laser beam for the second recording layer from (1) the new optimum recording power for the first recording layer which is decided by the fifth means and (2) a ratio between the first-time optimum recording powers for the first and second recording layers which are decided by the third means.

A second aspect of this invention is based on the first aspect thereof, and provides an apparatus wherein the trial write areas are out of overlap as viewed along the forward direction of the laser beam.

A third aspect of this invention is based on the first aspect thereof, and provides an apparatus wherein the optical disc has a recording management area, and the trial write areas extend in one of a radially inner side and a radially outer side with respect of the recording management area.

A fourth aspect of this invention is based on the first aspect thereof, and provides an apparatus wherein the optical disc has a recording management area, and first one of the trial write areas extends in a radially inner side with respect to the recording management area while second one of the trial write areas extends in a radially outer side with respect to the recording management area.

A fifth aspect of this invention is based on the first aspect thereof, and provides an apparatus further comprising means for recording signals representative of the first-time optimum recording powers decided by the third means on a recording management area in the optical disc.

A sixth aspect of this invention is based on the first aspect thereof, and provides an apparatus further comprising means for recording dummy data on a portion of the first recording layer which overlaps the trial write area in the second recording layer as viewed along the forward direction of the laser beam.

A seventh aspect of this invention provides a method of deciding optimum recording powers of a laser beam applied from an optical head to an optical disc having at least two recording layers which can be optically accessed by the laser beam from one side of the disc, and which are laminated in a forward direction of the laser beam. The recording layers have trial write areas respectively and include first and second recording layers. The optical head is closer to the first recording layer than the second recording layer. The method comprises the steps of a) deciding whether or not forthcoming recording of information on the optical disc is first time one; b) recording test signals on the trial write areas in the first and second recording layers by use of the optical head and the laser beam with varying powers, and reproducing the recorded test signals from the trial write areas in cases where the step a) decides that forthcoming recording of information on the optical disc is first time one; c) deciding first-time optimum recording powers of the laser beam for the respective first and second recording layers in response to the test signals reproduced by the step b); d) recording the test signals on the trial write area in the first recording layer by use of the optical head and the laser beam with varying powers, and reproducing the recorded test signals from the trial write area in the first recording layer in cases where the step a) decides that forthcoming recording of information on the optical disc is not first time one; e) deciding a new optimum recording power of the laser beam for the first recording layer in response to the test signals reproduced by the step d); and f) calculating a new optimum recording power of the laser beam for the second recording layer from (1) the new optimum recording power for the first recording layer which is decided by the step e) and (2) a ratio between the first-time optimum recording powers for the first and second recording layers which are decided by the step c).

An eighth aspect of this invention is based on the seventh aspect thereof, and provides a method further comprising the step of recording signals representative of the first-time optimum recording powers decided by the step c) on a recording management area in the optical disc.

A ninth aspect of this invention is based on the seventh aspect thereof, and provides a method further comprising the step of recording dummy data on a portion of the first recording layer which overlaps the trial write area in the second recording layer as viewed along the forward direction of the laser beam.

This invention has advantages as follows. In cases where forthcoming recording of information on the optical disc is first time one, the test signals are recorded and reproduced on and from the trial write areas in the first and second recording layers to decide first-time optimum recording powers of the laser beam for the first and second recording layers. On the other hand, in cases where forthcoming recording is not first time one, the test signals are recorded and reproduced on and from only the trial write area in the first recording layer to decide a new optimum recording power for the first recording layer. In these cases, a new optimum recording power for the second recording layer is calculated from (1) the new optimum recording power for the first recording layer and (2) the ratio between the first-time optimum recording powers for the first and second recording layers. Thus, the new optimum recording power for the second recording layer is obtained without performing the recording and reproduction of the test signals on and from the trial write area in the second recording layer. Therefore, it takes only a short time to obtain the new optimum recording power for the second recording layer. Furthermore, the trial write area in the first recording layer can be remarkably greater than that in the second recording layer. This is advantageous in increasing the possible number of times of the implementation of recording and reproducing the test signals on and from the trial write area in the first recording layer to decide an optimum recording laser power for the first recording layer.

DETAILED DESCRIPTION OF THE INVENTION

First Embodiment

Figure 1:
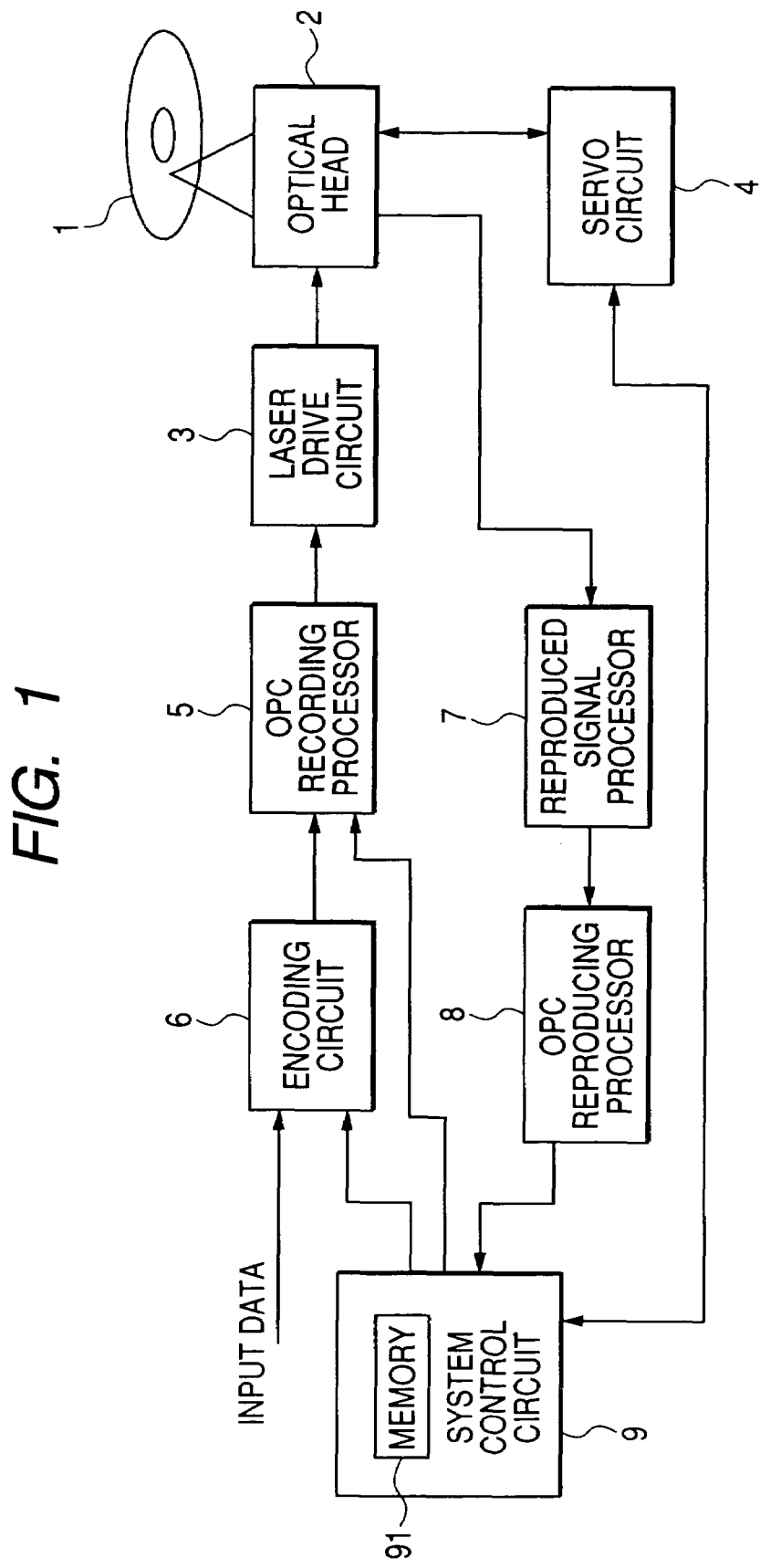
FIG. 1 is a block diagram of an optical-disc drive apparatus according to a first embodiment of this invention.

FIG. 1 shows a drive apparatus for an optical disc 1 according to a first embodiment of this invention. The drive apparatus of FIG. 1 includes an optical head 2, a laser drive circuit 3, a servo circuit 4, an OPC (optimum power control) recording processor 5, an encoding circuit 6, a reproduced signal processor 7, an OPC reproducing processor 8, and a system control circuit 9. The system control circuit 9 includes a microcomputer having a combination of an input/output port, a CPU, a ROM, a RAM, and another memory 91. The system control circuit 9 controls the devices and circuits 2, 3, 4, 5, 6, 7, and 8 so that information will be recorded on and reproduced from an optical disc 1 while a laser beam will be applied from the optical head 2 to the optical disc. During the recording of information on the optical disc 1, the power of the laser beam is controlled at an optimum value. The optical disc 1 is recordable or rewritable. The optical disc 1 has multiple recording layers. For example, the optical disc 1 is of a two-layer single-sided type.

During the recording and reproduction of information on and from the optical disc 1, the laser beam outputted from the optical head 2 reaches the optical disc 1 before being reflected by the optical disc 1. The optical head 2 receives a portion of the reflected laser beam. The optical head 2 changes the received laser beam into a corresponding electric signal through photoelectric conversion. The optical head 2 feeds the electric signal to the servo circuit 4. The servo circuit 4 implements tracking control, focusing control, and moving control (feeding control) of the laser beam relative to the optical disc 1 in response to the electric signal.

During a reproducing mode of operation of the drive apparatus in FIG. 1, a photodetector or photodetectors in the optical disc 1 convert an incident laser beam (the reflected laser beam) into a readout signal containing information recorded on the optical disc 1. The optical head 2 feeds the readout signal to the reproduced signal processor 7. The reproduced signal processor 7 subjects the readout signal to prescribed signal processing, and feeds the processing-resultant signal to the OPC reproducing processor 8.

During a trial writing and reproducing mode of operation of the drive apparatus in FIG. 1, the system control circuit 9 feeds trial write signals (test signals) to the OPC recording processor 5. The trial write signals are transmitted from the OPC recording processor 5 to the optical head 2 via the laser drive circuit 3. The OPC recording processor 5 controls a laser diode in the optical head 2 via the laser drive circuit 3, thereby recording the trial write signals on the optical disc 1 while sequentially changing the power of the laser beam among different values. The trial write signals are assigned to the different powers of the laser beam, respectively.

During the trial writing and reproducing mode of operation, the portion of the optical disc 1 which has the recorded trial write signals is scanned by the laser beam. The photodetector or photodetectors in the optical head 2 receive a portion of the reflected laser beam from the optical disc 1, and convert the received laser beam into a readout signal containing the trial write signals. The optical head 2 feeds the readout signal to the reproduced signal processor 7. The reproduced signal processor 7 subjects the readout signal to prescribed signal processing to reproduce the trial write signals. The reproduced signal processor 7 feeds the reproduced trial write signals to the OPC reproducing processor 8. The OPC reproducing processor 8 evaluates the reproduced trial write signals, and decides an optimum recording power of the laser beam on the basis of the results of the evaluation of the reproduced trial write signals. The OPC reproducing processor 8 notifies the decided optimum recording laser power to the system control circuit 9.

During a recording mode of operation which follows the trial write recording and reproducing mode of operation, the encoding circuit 6 encodes input data (information) to be recorded. The encoded data is transmitted from the encoding circuit 6 to the laser drive circuit 3 via the OPC recording processor 5. The system control circuit 9 notifies the optimum recording laser power to the laser drive circuit 3 via the OPC recording circuit 5. The laser drive circuit 3 generates a drive control signal in response to the encoded data and the optimum recording laser power. The generated drive control signal contains the encoded data. The drive control signal is fed from the laser drive circuit 3 to the laser diode in the optical head 2. The laser diode is driven by the drive control signal, thereby generating a laser beam containing the encoded data and having a power equal to the optimum power. The generated laser beam is applied to the optical disc 1 from the optical head 2 so that the encoded data is recorded on the optical disc 1.

Figure 2:
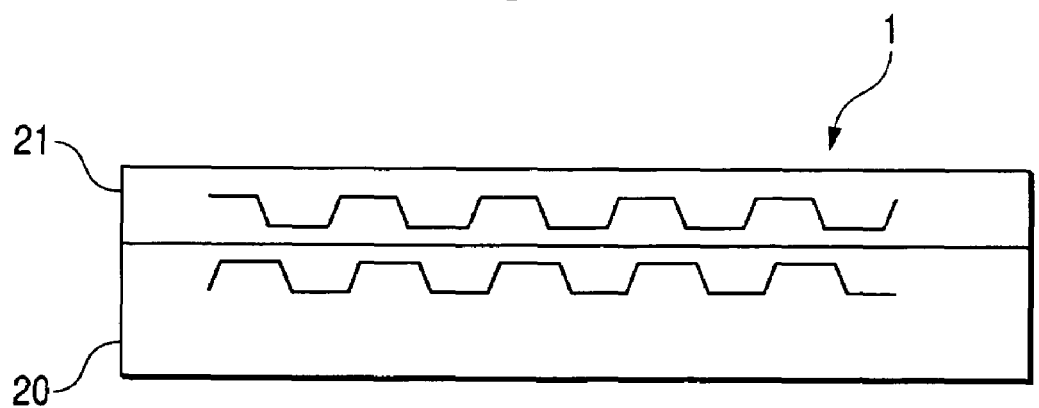
FIG. 2 is a sectional view of a portion of an optical disc in FIG. 1.

As shown in FIG. 2, the optical disc 1 has a laminate of multiple layers including a first recording layer 20 and a second recording layer 21. The optical disc 1 is of a two-layer single-sided structure. When the optical disc 1 is in position relative to the optical head 2, the first recording layer 20 is closer to the optical head 2 than the second recording layer 21 is. The thickness-wise distance between the first recording layer 20 and the second recording layer 21 is equal to about 40 to 60 μm. The point intermediate between the first recording layer 20 and the second recording layer 21 is about 0.57 mm away from a surface of the optical disc 1 in the thickness-wise direction. The first recording layer 20 is semitransparent while the second recording layer 21 is reflective. Each of the first and second recording layers 20 and 21 has a land and a groove. Data (information) can be written into the first and second recording layers 20 and 21.

Figure 3:
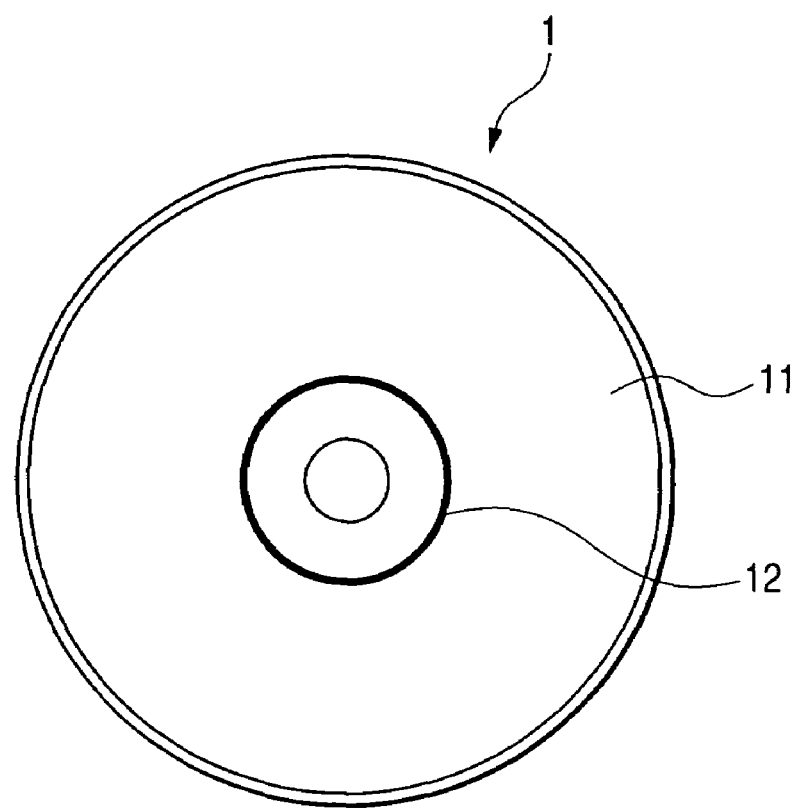
FIG. 3 is a top view of the optical disc in FIG. 1.

As shown in FIG. 3, the optical disc 1 has a data area 11 and a management area 12 which are concentrically arranged. The data area 11 extends radially outward of the management area 12. The optical disc 1 has a central opening 1A around which the management area 12 is located. The data area 11 has portions of the first and second recording layers 20 and 21. The management area 12 has other portions of the first and second recording layers 20 and 21. Data (information) can be written into the data area 11. The management area 12 includes an OPC area and a recording management area (RMA) in each of the first and second recording layers 20 and 21. The management area 12 includes a burst cutting area (BCA) in the first recording layer 20. The OPC area is used for trial writing. The OPC area is also referred to as the trial write area. Recording management information can be stored in the RMA. The recording management information represents the optical disc type, the recording system, and the number of times of recording. The BCA is used for adaptation to CPRM (content protection for prerecorded media). The OPC area may also be called a power calibration area (PCA) or a disc testing area (DTA).

Figure 4:
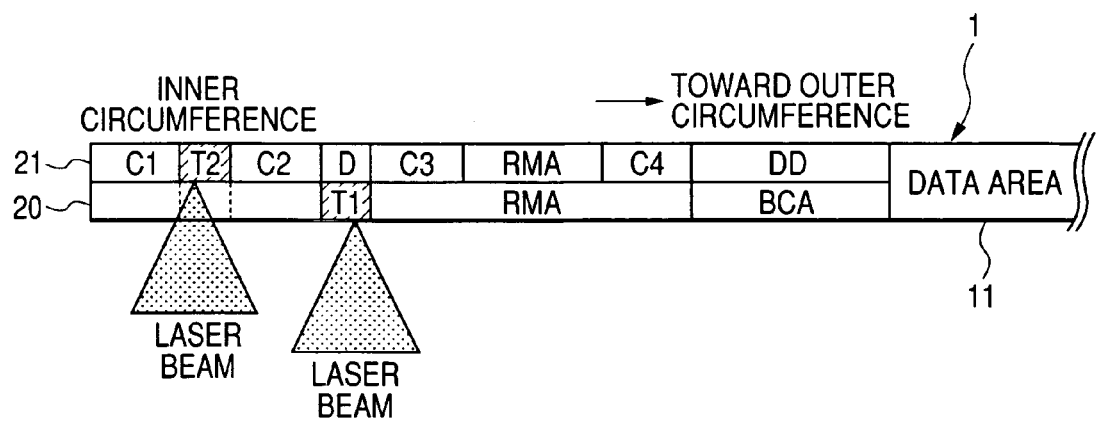
FIG. 4 is a sectional diagram of a portion of the optical disc in FIG. 1.

As shown in FIG. 4, the OPC area T1, the RMA, and the BCA in the first recording layer 20 are arranged in that order along the radially outward direction of the optical disc 1. The OPC area T2 and the RMA in the second recording layer 21 are arranged in that order along the radially outward direction of the optical disc 1. The OPC areas T1 and T2 do not overlap and are spaced from each other as viewed in the thickness-wise direction of the optical disc 1, that is, the axially forward direction of the laser beam. In other words, the OPC areas T1 and T2 are out of overlap. The OPC area T1 extends radially outward of the OPC area T2 as viewed along the axially forward direction of the laser beam. The RMA in the first recording layer 20 and the RMA in the second recording layer 21 align as viewed in the thickness-wise direction of the optical disc 1. Generally, the RMA in the first recording layer 20 is greater in size than that in the second recording layer 21. The data area 11 formed by portions of the first and second recording layers 20 and 21 extends adjacently radially outward of the BCAs therein.

Margin areas C1, C2, C3, and C4 are provided in the second recording layer 21. A portion of the second recording layer 21 which aligns and completely overlaps with the OPC area T1 in the first recording layer 20 is defined as a dead area D. A portion of the second recording layer 21 which aligns and completely overlaps with the BCA in the first recording layer 20 is defined as a dead area DD. The margin area C1, the OPC area T2, the margin area C2, the dead area D, the margin area C3, the RMA, the margin area C4, and the dead area DD in the second recording layer 21 are arranged in that order as viewed along the radially outward direction of the optical disc 1. The OPC area T2 is sandwiched between the margin areas C1 and C2. The RMA in the second recording layer 21 is sandwiched between the margin areas C3 and C4. The margin areas C3 and C4 extend directly above portions of the RMA in the first recording layer 20. The margin areas C1, C2, C3, and C4 are designed to absorb the adverse effects of the eccentricities of the first and second recording layers 20 and 21 and the change in diameter of the laser beam along the thickness-wise direction of the optical disc 1. The widths of the margin areas C1, C2, C3, and C4 in the radial direction of the optical disc 1 are equal to about 100 μm. Basically, the laser beam is of a conic shape. In the case where the laser beam is focused into a spot on the second recording layer 21, the cross-section of the laser beam in the first recording layer 20 is greater in diameter than the spot. The margin areas C1, C2, C3, and C4 are chosen in light of such a greater cross-section of the laser beam in the first recording layer 20 during the scanning of the OPC area T2 and the RMA in the second recording layer 21. Especially, during the scanning of the OPC area T2 in the second recording layer 21, the margin area C2 prevents the exposure of at least a portion of the OPC area T1 in the first recording layer 20 to the laser beam which would adversely affect the OPC area T1.

The drive apparatus of FIG. 1 implements a method of deciding optimum recording laser powers as follows. The servo circuit 4 is controlled by the system control circuit 9 to move the optical head 2 to a position directly facing the management area 12 in the optical disc 1. The optical head 2 reads out, from the RMA in first recording layer 20 or the second recording layer 21, a signal containing information representing the number of times of recording. The optical head 2 outputs the readout signal to the reproduced signal processor 7. The reproduced signal processor 7 reproduces the recording-times-number information from the readout signal. The recording-times-number information is transmitted from the reproduced signal processor 7 to the system control circuit 9 via the OPC reproducing processor 8. It should be noted that the recording-times-number information may be directly sent from the reproduced signal processor 7 to the system control circuit 9.

The system control circuit 9 decides whether or not forthcoming recording of information on the optical disc 1 is the first time one for the optical disc 1 on the basis of the recording-times-number information.

When it is decided that forthcoming recording of information on the optical disc 1 is the first time one, the system control circuit 9 controls the devices and circuits 2, 3, 4, 5, 6, 7, and 8 to perform an OPC procedure in a known way which uses the OPC area T1 in the first recording layer 20 of the optical disc 1. As a result, an optimum recording laser power PL1 is decided for the first recording layer 20 in the optical disc 1. The optimum recording laser power PL1 is notified from the OPC reproducing processor 8 to the system control circuit 9. The system control circuit 9 stores a signal representative of the optimum recording laser power PL1 into the internal memory 91 as a signal representative of a first-time optimum power ML1.

During the above-mentioned OPC procedure, the system control circuit 9 feeds test signals each of a prescribed pattern to the OPC recording processor 5. The feed of the test signals from the system control circuit 9 to the OPC recording processor 5 may be through the encoding circuit 6. The test signals are transmitted from the OPC recording processor 5 to the optical head 2 via the laser drive circuit 3. The OPC recording processor 5 controls the laser diode in the optical head 2 via the laser drive circuit 3, thereby recording the test signals on the OPC area T1 in the first recording layer 20 of the optical disc 1 while sequentially changing the power of the laser beam among different values. The test signals are assigned to the different powers of the laser beam, respectively. Thereafter, the OPC area T1 is scanned for signal reading, and the optical head 2 generates a readout signal containing the test signals. The optical head 2 feeds the readout signal to the reproduced signal processor 7. The reproduced signal processor 7 reproduces the test signals from the readout signal. The reproduced signal processor 7 feeds the reproduced test signals to the OPC reproducing processor 8. Basically, the OPC reproducing processor 8 estimates the jitters of the respective reproduced test signals. The OPC reproducing processor 8 compares the estimated jitters to select the smallest one therefrom. The OPC reproducing processor 8 designates the laser power, which corresponds to the smallest-jitter reproduced test signal, as an optimum recording laser power for the first recording layer 20 of the optical disc 1.

Figure 5:
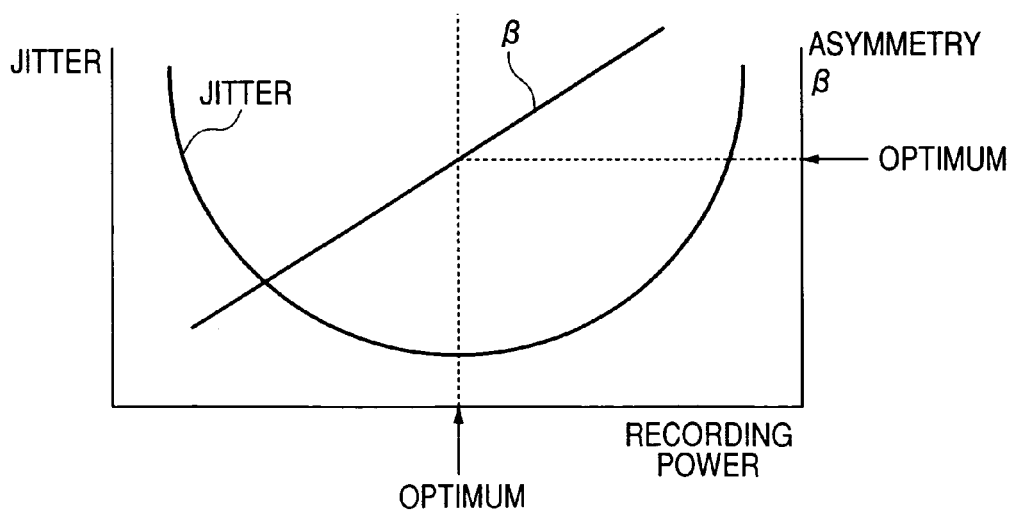
FIG. 5 is a diagram of the relation among the power of a laser beam used to record a signal, the jitter of a reproduced signal originating from the recorded signal, and the asymmetry value "β" of the reproduced signal.

With reference to FIG. 5, the jitter of a reproduced signal decreases to a minimum and then increases from the minimum as the power of the laser beam used to record the original signal rises. The asymmetry value "β" of the reproduced signal is proportional to the power of the laser beam used to record the original signal. In the case where the original signal is recorded at the optimum laser power, the asymmetry value "β" of the corresponding reproduced signal is regarded as a substantially desired value.

Figure 6:
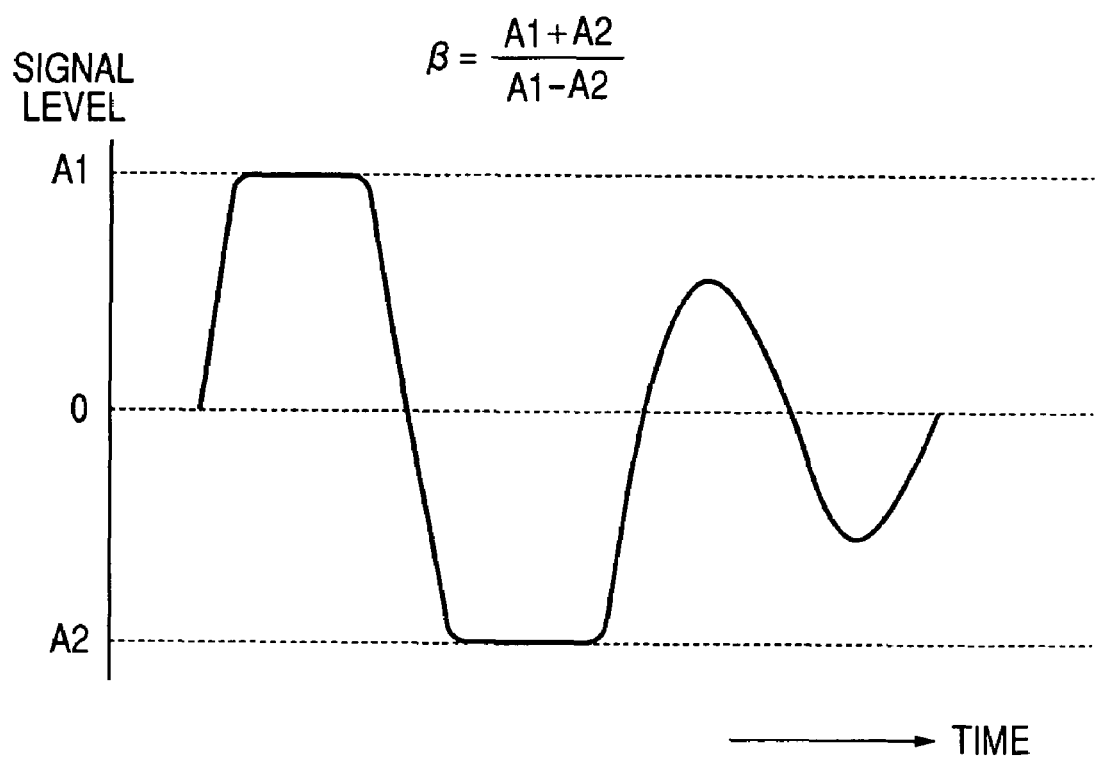
FIG. 6 is a time-domain diagram of an example of the waveform of a reproduced signal which is used for indicating the definition of a reproduced-signal asymmetry value "β".

With reference to FIG. 6, the asymmetry value "β" of the reproduced signal is defined as a value resulting from dividing the difference between a peak value A1 and a bottom value A2 of the reproduced signal by the sum (peak-to-peak) of them. Specifically, the asymmetry value "β" is expressed as "β=(A1+A2)/(A1−A2)". It should be noted that the peak value A1 is defined as a positive value while the bottom value A2 is defined as a negative value. In the case where the recording laser power is optimum so that the jitter of the corresponding reproduced signal is minimized, the asymmetry value "β" of the reproduced signal is regarded as desired one. The desired asymmetry value "β" varies from optical head to optical head. In addition, the desired asymmetry value "β" varies from optical disc to optical disc. During the manufacture of drive apparatuses, the desired asymmetry value "β" is determined through experiments on an apparatus-by-apparatus basis and on a disc-by-disc basis. A signal representing the desired asymmetry value "β" is stored in the ROM or the memory 91 within the system control circuit 9.

The system control circuit 9 notifies the desired asymmetry value "β" to the OPC reproducing processor 8. The OPC reproducing processor 8 calculates and detects the actual asymmetry values "β" of the respective reproduced test signals. The OPC reproducing processor 8 compares the actual asymmetry values "β" with the desired asymmetry value "β" to select one from the actual asymmetry values "β" which is equal or the nearest to the desired asymmetry value "β". The OPC reproducing processor 8 designates the laser power, which corresponds to the reproduced test signal with the selected asymmetry value "β", as an optimum recording laser power PL1 for the first recording layer 20 of the optical disc 1. The OPC reproducing processor 8 notifies the optimum recording laser power PL1 to the system control circuit 9. The system control circuit 9 stores a signal representative of the optimum recording laser power PL1 into the internal memory 91 as a signal representative of a first-time optimum power ML1.

Subsequently, the system control circuit 9 controls the servo circuit 4 to move an objective lens in the optical head 2 toward the optical disc 1 by a prescribed distance and move the optical head 2 to a position directly facing the start point of the OPC area T2 in the second recording layer 21 of the optical disc 1. Then, the system control circuit 9 controls the devices and circuits 2, 3, 4, 5, 6, 7, and 8 to perform an OPC procedure which uses the OPC area T2 in the second recording layer 21 of the optical disc 1. The OPC procedure using the OPC area T2 is similar to that using the OPC area T1. As a result of the OPC procedure using the OPC area T2, an optimum recording laser power PL2 is decided for the second recording layer 21 in the optical disc 1. The optimum recording laser power PL2 is notified from the OPC reproducing processor 8 to the system control circuit 9. The system control circuit 9 stores a signal representative of the optimum recording laser power PL2 into the internal memory 91 as a signal representative of a first-time optimum power ML2.

It should be noted that the system control circuit 9 may calculate the ratio "ML2/ML1" between the first-time optimum powers ML1 and ML2. In this case, the system control circuit 9 stores a signal representative of the power ratio "ML2/ML1" into the internal memory 91.

Preferably, at the shipment of the drive apparatus from the factory or at an initial stage of the first-time recording by the drive apparatus of FIG. 1, dummy data is recorded on a portion of the first recording layer 20 which overlaps the margin area C1, the OPC area T2, and the margin area C2 in the second recording layer 21 as viewed along the axially forward direction of the laser beam. Therefore, during the OPC procedure using the OPC area T2, the laser beam passes through the dummy-data already-recorded region of the first recording layer 20 before reaching the OPC area T2. These conditions of the laser beam are similar or equivalent to those occurring in the case where the laser beam passes through a data-already-recorded region of the first recording layer 20 in the data area 11 before reaching the second recording layer 21 in the data area 11 to record data (information) thereon. Accordingly, the optimum recording laser power PL2 and the first-time optimum power ML2 are accurate and reliable for the recording of data (information) on the second recording layer 21 in the data area 11.

Next, the system control circuit 9 controls the servo circuit 4 to move the optical head 2 to a position directly facing the start point of the data area 11 of the optical disc 1 and focus the laser beam on the first recording layer 20. Then, the system control circuit 9 controls the devices and circuits 2, 3, 4, 5, 6, 7, and 8 to start the recording of data on the first recording layer 20 in the data area 11 and equalize the power of the laser beam to the optimum recording laser power PL1. During the recording of data on the first recording layer 20 in the data area 11, the power of the laser beam is maintained at the optimum recording laser power PL1. When the recording of data on the first recording layer 20 in the data area 11 has been completed, the system control circuit 9 controls the servo circuit 4 to move the objective lens in the optical head 2 toward the optical disc 1 by the prescribed distance to focus the laser beam on the second recording layer 21. Then, the system control circuit 9 controls the devices and circuits 2, 3, 4, 5, 6, 7, and 8 to implement the recording of data on the second recording layer 21 in the data area 11 and equalize the power of the laser beam to the optimum recording laser power PL2. During the recording of data on the second recording layer 21 in the data area 11, the power of the laser beam is maintained at the optimum recording laser power PL2.

As previously mentioned, the system control circuit 9 decides whether or not forthcoming recording of information on the optical disc 1 is the first time one for the optical disc 1.

When it is decided that forthcoming recording of information on the optical disc 1 is not the first time one, that is, when it is decided that forthcoming recording is the second or later time one, the system control circuit 9 controls the devices and circuits 2, 3, 4, 5, 6, 7, and 8 to perform the OPC procedure which uses the OPC area T1 in the first recording layer 20 of the optical disc 1. As a result, a new optimum recording laser power PL1 is decided for the first recording layer 20 in the optical disc 1. The new optimum recording laser power PL1 is notified from the OPC reproducing processor 8 to the system control circuit 9. The system control circuit 9 stores a signal representative of the new optimum recording laser power PL1 into the internal memory 91. Subsequently, the system control circuit 9 reads out the signals representative of the first-time optimum powers. ML1 and ML2 from the memory 91. Then, the system control circuit 9 calculates a new optimum recording laser power PL2 for the second recording layer 21 in the optical disc 1 from the new optimum recording laser power PL1 and the first-time optimum powers ML1 and ML2 according to the following equation.

$$PL2 = PL1 \cdot ML2/ML1 \quad (1)$$

It should be noted that the system control circuit 9 may use the signal representative of the ratio "ML2/ML1" instead of the signals representative of the first-time optimum powers ML1 and ML2. The system control circuit 9 stores a signal representative of the new optimum recording laser power PL2 into the internal memory 91.

Thereafter, the system control circuit 9 controls the devices and circuits 2, 3, 4, 5, 6, 7, and 8 to implement the recording of data (information) on the first and second recording layers 20 and 21 in the data area 11. Furthermore, the system control circuit 9 operates so that the power of the laser beam will be equal to the new optimum recording laser power PL1 during the recording of data on the first recording layer 20 in the data area 11 and will be equal to the new optimum recording laser power PL2 during the recording of data on the second recording layer 21 in the data area 11.

Figure 7:
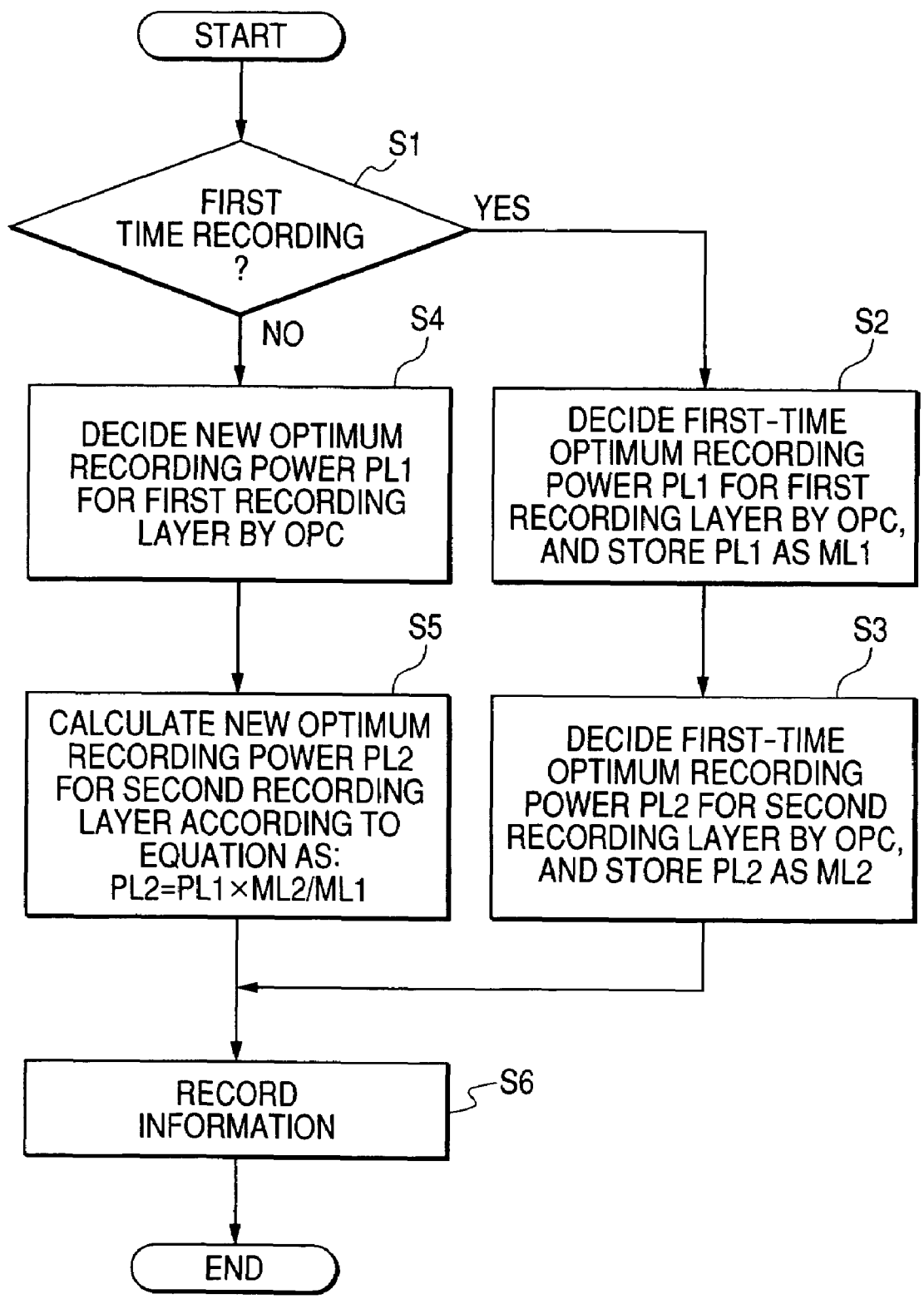
FIG. 7 is a flowchart of a segment of a computer program for a system control circuit in FIG. 1.

The system control circuit 9 operates in accordance with a computer program stored in the ROM, the RAM, or the memory 91. FIG. 7 is a flowchart of a segment of the computer program.

As shown in FIG. 7, a first step S1 of the program segment decides whether or not forthcoming recording of information on the optical disc 1 is the first time one for the optical disc 1 on the basis of the recording-times-number information. When it is decided that forthcoming recording is the first time one, the program advances from the step S1 to a step S2. Otherwise, the program advances from the step S1 to a step S4.

The step S2 controls the devices and circuits 2, 3, 4, 5, 6, 7, and 8 to perform an OPC procedure which uses the OPC area T1 in the first recording layer 20 of the optical disc 1. As a result, an optimum recording laser power PL1 is decided for the first recording layer 20 in the optical disc 1. The step S2 is notified of the optimum recording laser power PL1 by the OPC reproducing processor 8. The step S2 stores a signal representative of the optimum recording laser power PL1 into the memory 91 as a signal representative of a first-time optimum power ML1.

A step S3 following the step S2 controls the devices and circuits 2, 3, 4, 5, 6, 7, and 8 to perform an OPC procedure which uses the OPC area T2 in the second recording layer 21 of the optical disc 1. As a result, an optimum recording laser power PL2 is decided for the second recording layer 21 in the optical disc 1. The step S3 is notified of the optimum recording laser power PL2 by the OPC reproducing processor 8. The step S3 stores a signal representative of the optimum recording laser power PL2 into the memory 91 as a signal representative of a first-time optimum power ML2. After the step S3, the program advances to a step S6.

It should be noted that the step S3 may calculate the ratio "ML2/ML1" between the first-time optimum powers ML1 and ML2. In this case, the step S3 stores a signal representative of the power ratio "ML2/ML1" into the internal memory 91.

The step S4 controls the devices and circuits 2, 3, 4, 5, 6, 7, and 8 to perform the OPC procedure which uses the OPC area T1 in the first recording layer 20 of the optical disc 1. As a result, a new optimum recording laser power PL1 is decided for the first recording layer 20 in the optical disc 1. The step S4 is notified of the new optimum recording laser power PL1 by the OPC reproducing processor 8. The step S4 stores a signal representative of the new optimum recording laser power PL1 into the memory 91.

A step S5 following the step S4 reads out the signals representative of the first-time optimum powers ML1 and ML2 from the memory 91. Then, the step S5 calculates a new optimum recording laser power PL2 for the second recording layer 21 in the optical disc 1 from the new optimum recording laser power PL1 and the first-time optimum powers ML1 and ML2 according to the previously-indicated equation (1). It should be noted that the step S5 may use the signal representative of the ratio "ML2/ML1" instead of the signals representative of the first-time optimum powers ML1 and ML2. The step S5 stores a signal representative of the new optimum recording laser power PL2 into the memory 91. After the step S5, the program advances to the step S6.

The step S6 controls the devices and circuits 2, 3, 4, 5, 6, 7, and 8 to record data (information) on the first and second recording layers 20 and 21 in the data area 11. The step S6 functions to maintain the power of the laser beam at the newest optimum recording laser power PL1 during the recording of data on the first recording layer 20 in the data area 11. The step S6 functions to maintain the power of the laser beam at the newest optimum recording laser power PL2 during the recording of data on the second recording layer 21 in the data area 11. After the step S6, the current execution cycle of the program segment ends.

As previously mentioned, in the case where forthcoming recording of information on the optical disc 1 is the second or later time one, a new optimum recording laser power PL2 for the second recording layer 21 of the optical disc 1 is decided without carrying out the OPC procedure using the OPC area T2 in the second recording layer 21. Therefore, it is possible to promptly start the recording of data (information) on the second recording layer 21 in the data area 11. Furthermore, the single-time implementation of the OPC procedure using the OPC area T2 suffices.

As previously mentioned, the OPC procedure using the OPC area T2 in the second recording layer 21 is carried out only when forthcoming recording of information on the optical disc 1 is the first time one. Therefore, the OPC area T2 can be small in size. The smaller size of the OPC area T2 allows a greater size of the OPC area T1 in the first recording layer 20. As the OPC area T1 is greater, the OPC procedure using the OPC area T1 can be implemented more times.

Second Embodiment

A second embodiment of this invention is similar to the first embodiment thereof except for design changes described hereafter. The second embodiment of this invention uses an optical disc 1A instead of the optical disc 1 (see FIGS. 3 and 4).

Figure 8:
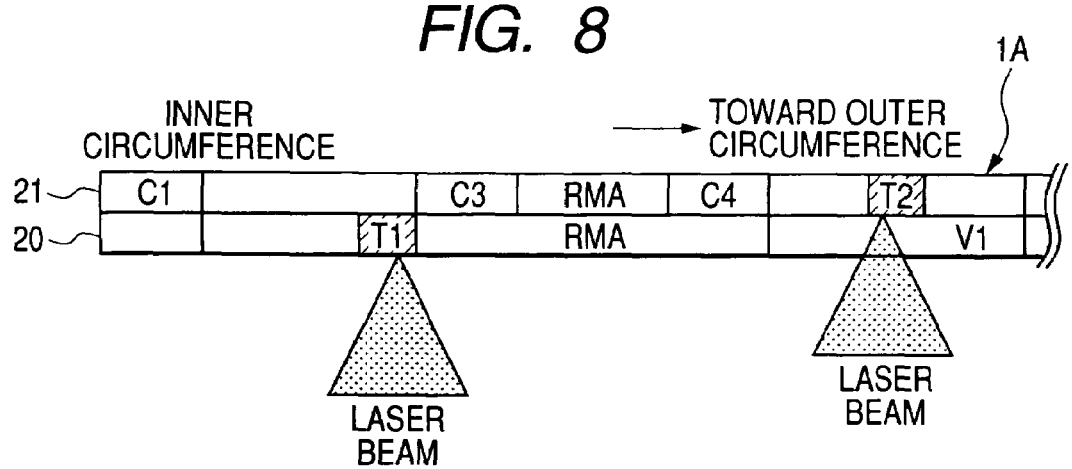
FIG. 8 is a sectional diagram of a portion of an optical disc in a second embodiment of this invention.

With reference to FIG. 8, the optical disc 1A is of a two-layer single-sided structure. A BCA is omitted from each of first and second recording layers 20 and 21 in a management area of the optical disc 1A. In the management area, an OPC area T2 is provided in a portion (a BCA corresponding portion) of the second recording layer 21 which extends radially outward of the margin area C4 and the RMA. A portion of the second recording layer 21 which extends radially inward of the margin area C3 and the RMA is not used for the OPC area T2. In the management area, a portion (a BCA corresponding portion) of the first recording layer 20 which extends radially outward of the RMA is defined as an unoccupied area V1.

Basically, the OPC area T2 in the second recording layer 21 and the unoccupied area V1 in the first recording layer 20 align as viewed in the thickness-wise direction of the optical disc 1A. The OPC area T2 is smaller in radial-direction width than the unoccupied area V1. Therefore, the unoccupied area V1 fully covers the OPC area T2 as viewed in the axially forward direction of the laser beam (the thickness-wise direction of the optical disc 1A).

The width of the OPC area T1 in the first recording layer 20 in the radial direction of the optical disc 1A is equal to, for example, about 50 µm. The capacity of the OPC area T1 corresponds to, for example, about 1600 sectors. The width of the OPC area T2 in the second recording layer 21 in the radial direction of the optical disc 1A is equal to, for example, about 20 µm. The capacity of the OPC area T2 corresponds to, for example, about 640 sectors.

It is preferable that at the shipment of the drive apparatus from the factory or at an initial stage of the first-time recording by the drive apparatus, dummy data is recorded on the unoccupied area V1 in the first recording layer 20. In this case, during the OPC procedure using the OPC area T2, the laser beam passes through the dummy-data already-recorded region V1 of the first recording layer 20 before reaching the OPC area T2. These conditions of the laser beam are similar or equivalent to those occurring in the case where the laser beam passes through a data-already-recorded region of the first recording layer 20 in the data area 11 before reaching the second recording layer 21 in the data area 11 to record data (information) thereon. Accordingly, an optimum recording laser power PL2 and a first-time optimum power ML2 decided as a result of the OPC procedure using the OPC area T2 are accurate and reliable for the recording of data (information) on the second recording layer 21 in the data area 11.

The OPC area T1 in the first recording layer 20 is located radially inward of the RMA. The OPC area T2 in the second recording layer 21 is located radially outward of the RMA. This arrangement is advantageous in increasing a possible number of times of the implementation of the OPC procedure using the OPC area T1 or the OPC area T2.

The capacity of the OPC area T2 corresponds to, for example, 640 sectors. In this case, the OPC procedure using the OPC area T2 can be implemented by 40 different drive apparatuses provided that the single-time implementation of the OPC procedure consumes 16 sectors.

It should be noted that the unoccupied area V1 may remain without being loaded with dummy data. Furthermore, the positions of the OPC areas T1 and T2 may be changed as follows. Both the OPC areas T1 and T2 are located in one of the radially inner side and the radially outer side with respect to the RMA.

Third Embodiment

A third embodiment of this invention is similar to the second embodiment thereof except for design changes described hereafter. The third embodiment of this invention uses an optical disc 1B instead of the optical disc 1A (see FIG. 8).

Figure 9:
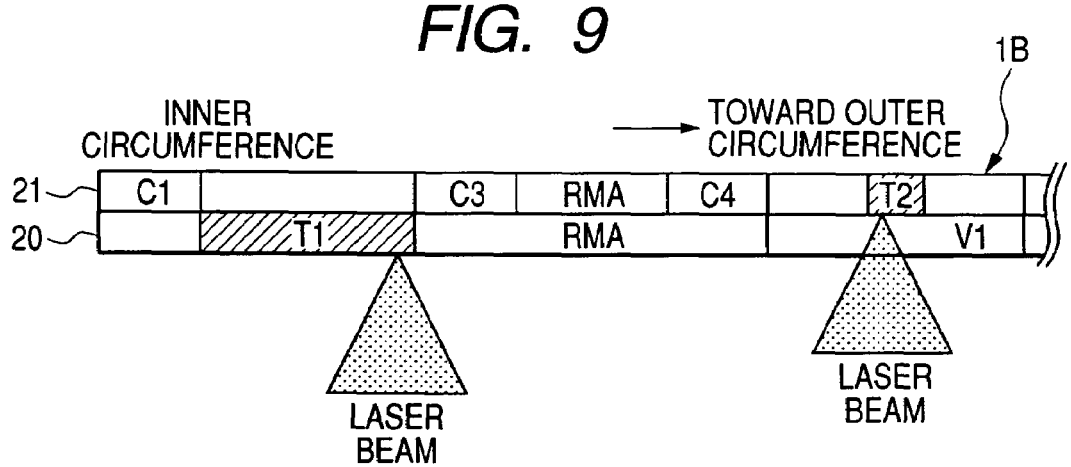
FIG. 9 is a sectional diagram of a portion of an optical disc in a third embodiment of this invention.

With reference to FIG. 9, the optical disc 1B is of a two-layer single-sided structure. The OPC areas T1 and T2 in the optical disc 1B are extended from those in FIG. 8. In FIG. 9, the OPC area T1 starts from a point directly below the outer end of the margin area C1 and terminates at a point directly below the inner end of the margin area C3.

The width of the OPC area T1 in the radial direction of the optical disc 1B is equal to, for example, about 200 µm. The capacity of the OPC area T1 corresponds to, for example, about 6400 sectors. In this case, the OPC procedure using the OPC area T1 can be repetitively implemented up to 400 times provided that the single-time implementation of the OPC procedure consumes 16 sectors. Thus, the recording of data (information) on the data area in the optical disc 1B can be implemented up to 400 times.

Fourth Embodiment

A fourth embodiment of this invention is similar to the second or third embodiment thereof except for design changes described hereafter. The fourth embodiment of this invention uses an optical disc 1C instead of the optical disc 1A (see FIG. 8) or the optical disc 1B (see FIG. 9).

Figure 10:
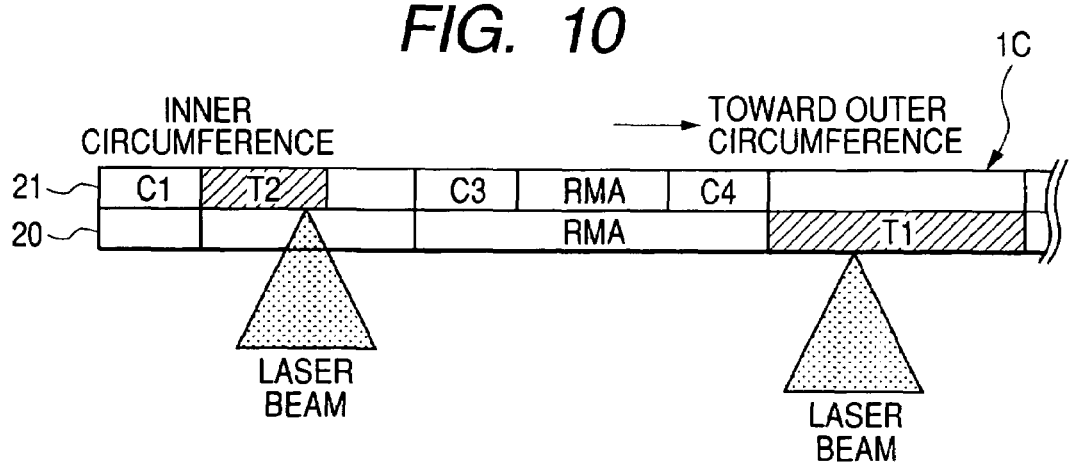
FIG. 10 is a sectional diagram of a portion of an optical disc in a fourth embodiment of this invention.

With reference to FIG. 10, the optical disc 1C is of a two-layer single-sided structure. In the optical disc 1C, the OPC area T1 of the first recording layer 20 is located radially outward of the RMA while the OPC area T2 of the second recording layer 21 is located radially inward of the RMA.

Fifth Embodiment

A fifth embodiment of this invention is similar to the first embodiment thereof except for design changes described hereafter. The fifth embodiment of this invention uses an optical disc 1D instead of the optical disc 1 (see FIGS. 3 and 4).

Figure 11:
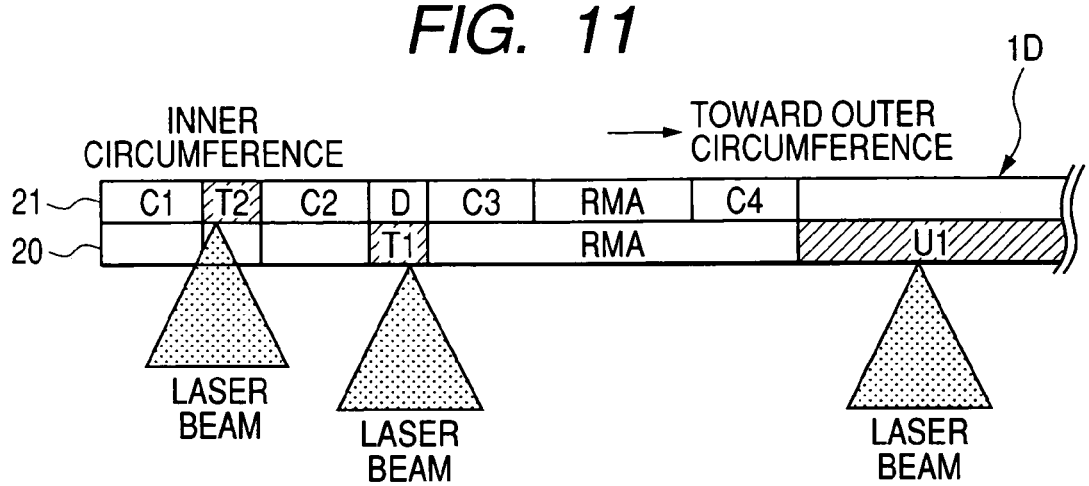
FIG. 11 is a sectional diagram of a portion of an optical disc in a fifth embodiment of this invention.

With reference to FIG. 11, the optical disc 1D is of a two-layer single-sided structure. A BCA is omitted from a first recording layer 20 in a management area of the optical disc 1D. In the management area, an additional OPC area U1 is provided in a portion (a BCA corresponding portion) of the first recording layer 20 which extends radially outward of the RMA.

The system control circuit 9 (see FIG. 1) can control the devices and circuits 2, 3, 4, 5, 6, 7, and 8 (see FIG. 1) to implement an OPC procedure using the OPC area U1. As a result of the OPC procedure using the OPC area U1, an optimum recording laser power PL1 is decided for the first recording layer 20 in the optical disc 1D. A possible number of times of the implementation of the OPC procedure for the first recording layer 20 can be increased by a value corresponding to the capacity of the OPC area U1.

For example, the system control circuit 9 functions to use the OPC area T1 first and the OPC area U1 second for the OPC procedure. According to another example, the system control circuit 9 functions to use the OPC area U1 first and the OPC area T1 second for the OPC procedure.

The system control circuit 9 may function to sequentially implement the OPC procedure using the OPC area T1 and the OPC procedure using the OPC area U1 and calculate a mean value between an optimum recording laser power decided by the OPC procedure using the OPC area T1 and an optimum recording laser power decided by the OPC procedure using the OPC area U1. In this case, the system control circuit 9 designates the mean value as a final optimum recording laser power for the first recording layer 20.

It should be noted that the positions of the OPC areas T1, T2, and U1 may be changed as follows. The OPC areas T1 and T2 are located radially outward of the RMA while the OPC area U1 is located radially inward of the RMA.

Sixth Embodiment

A sixth embodiment of this invention is similar to the first embodiment thereof except for design changes described hereafter. The sixth embodiment of this invention uses an optical disc 1E instead of the optical disc 1 (see FIGS. 3 and 4).

Figure 12:
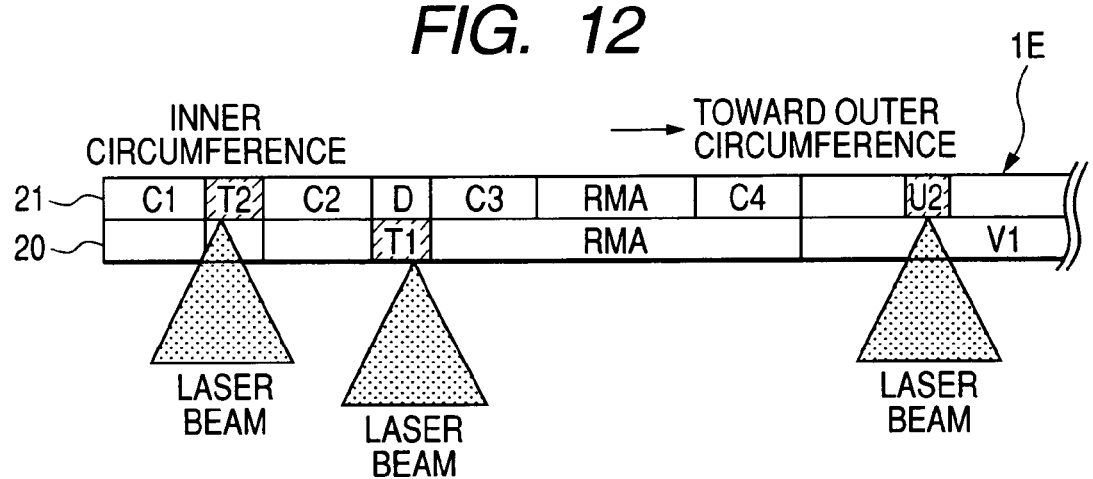
FIG. 12 is a sectional diagram of a portion of an optical disc in a sixth embodiment of this invention.

With reference to FIG. 12, the optical disc 1E is of a two-layer single-sided structure. A BCA is omitted from a first recording layer 20 in a management area of the optical disc 1E. In the management area, an additional OPC area U2 is provided in a portion of the second recording layer 21 which extends radially outward of the RMA.

In the management are, a portion (a BCA corresponding portion) of the first recording layer 20 which extends radially outward of the RMA is defined as an unoccupied area V1. The unoccupied area V1 fully covers the OPC area U2 as viewed in the axially forward direction of the laser beam (the thickness-wise direction of the optical disc 1E).

It is preferable that at the shipment of the drive apparatus from the factory or at an initial stage of the first-time recording by the drive apparatus, dummy data is recorded on the unoccupied area V1 in the first recording layer 20.

The system control circuit 9 (see FIG. 1) can control the devices and circuits 2, 3, 4, 5, 6, 7, and 8 (see FIG. 1) to implement an OPC procedure using the OPC area U2. As a result of the OPC procedure using the OPC area U2, an optimum recording laser power PL2 is decided for the second recording layer 21 in the optical disc 1E. A possible number of times of the implementation of the OPC procedure for the second recording layer 21 can be increased by a value corresponding to the capacity of the OPC area U2.

The system control circuit 9 may function to sequentially implement the OPC procedure using the OPC area T2 and the OPC procedure using the OPC area U2 and calculate a mean value between an optimum recording laser power decided by the OPC procedure using the OPC area T2 and an optimum recording laser power decided by the OPC procedure using the OPC area U2. In this case, the system control circuit 9 designates the mean value as a final optimum recording laser power for the second recording layer 21.

It should be noted that the positions of the OPC areas T1, T2, and U2 may be changed as follows. The OPC areas T1 and T2 are located radially outward of the RMA while the OPC area U2 is located radially inward of the RMA.

Seventh Embodiment

A seventh embodiment of this invention is similar to the first embodiment thereof except for design changes described hereafter. The seventh embodiment of this invention uses an optical disc 1F instead of the optical disc 1 (see FIGS. 3 and 4).

Figure 13:
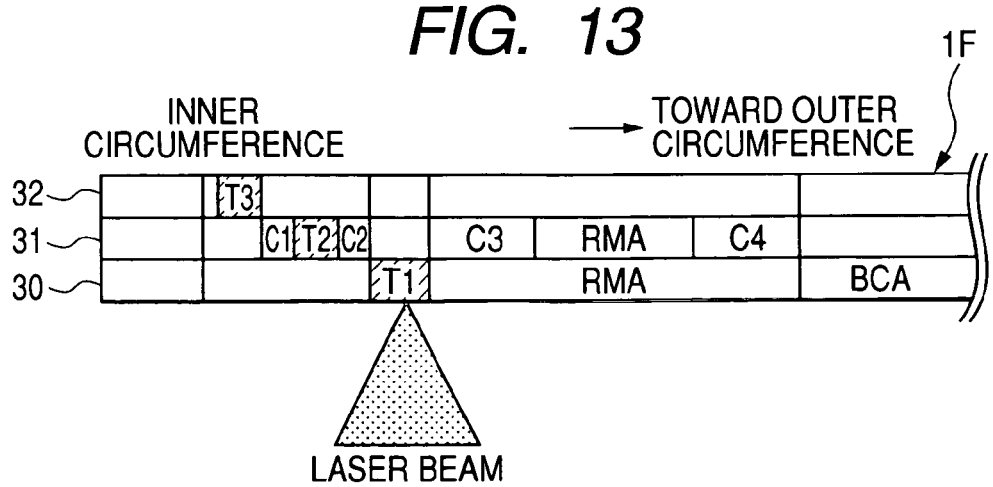
FIG. 13 is a sectional diagram of a portion of an optical disc in a seventh embodiment of this invention.

As shown in FIG. 13, the optical disc 1F has a laminate of multiple layers including a first recording layer 30, a second recording layer 31, and a third recording layer 32 which are arranged in that order. The optical disc 1F is of a three-layer single-sided structure. When the optical disc 1F is in position relative to the optical head 2 (see FIG. 1), the first recording layer 30 is closer to the optical head 2 than the second recording layer 31 is. The second recording layer 31 is closer to the optical head 2 than the third recording layer 32 is. The first and second recording layers 30 and 31 are semitransparent while the third recording layer 32 is reflective. Each of the first, second, and third recording layer 30, 31, and 32 has a land and a groove. Data (information) can be written into the first, second, and third recording layers 30, 31, and 32.

The optical disc 1F has a data area and a management area which are concentrically arranged. The data area extends radially outward of the data area. Data (information) can be written into the data area. The management area includes an OPC area and a BCA in each of the first, second, and third recording layers 30, 31, and 32. The management area includes an RMA in each of the first and second recording layers 30 and 31.

As shown in FIG. 13, the OPC area T1, the RMA, and the BCA in the first recording layer 30 are arranged in that order along the radially outward direction of the optical disc 1F. The OPC area T2, the RMA, and the BCA in the second recording layer 31 are similarly arranged. The OPC area T3 and the BCA in the third recording layer 32 are arranged in that order along the radially outward direction of the optical disc 1F. The OPC areas T1, T2, and T3 do not overlap and are spaced from each other as viewed in the thickness-wise direction of the optical disc 1F, that is, the axially forward direction of the laser beam. The OPC area T1 extends radially outward of the OPC area T2 as viewed along the axially forward direction of the laser beam. The OPC area T2 extends radially outward of the OPC area T3 as viewed along the axially forward direction of the laser beam. The RMA in the first recording layer 30 and the RMA in the second recording layer 31 align as viewed in the thickness-wise direction of the optical disc 1F. Generally, the RMA in the first recording layer 30 is greater in size than the RMA in the second recording layer 31. The BCA in the first recording layer 30, the BCA in the second recording layer 31, and the BCA in the third recording layer 32 align as viewed in the thickness-wise direction of the optical disc 1F. The data area formed by portions of the first, second, and third recording layers 30, 31, and 32 extends adjacently radially outward of the BCAs therein.

Margin areas C1, C2, C3, and C4 are provided in the second recording layer 31. A portion of the second recording layer 31 which aligns and completely overlaps with the OPC area T1 in the first recording layer 30 is defined as a dead area D. The margin area C1, the OPC area T2, the margin area C2, the dead area D, the margin area C3, the RMA, the margin area C4, and the BCA in the second recording layer 31 are arranged in that order as viewed along the radially outward direction of the optical disc 1F. The OPC area T2 is sandwiched between the margin areas C1 and C2. The RMA in the second recording layer 31 is sandwiched between the margin areas C3 and C4. The margin areas C3 and C4 extend directly above portions of the RMA in the first recording layer 30. The margin areas C1, C2, C3, and C4 are designed to absorb the adverse effects of the eccentricities of the first, second, and third recording layers 30, 31, and 32 and the change in diameter of the laser beam along the thickness-wise direction of the optical disc 1F.

The system control circuit 9 (see FIG. 1) decides whether or not forthcoming recording of information on the optical disc 1F is the first time one for the optical disc 1F on the basis of the recording-times-number information.

When it is decided that forthcoming recording is the first time one, the system control circuit 9 controls the devices and circuits 2, 3, 4, 5, 6, 7, and 8 (see FIG. 1) to perform an OPC procedure which uses the OPC area T1 in the first recording layer 30 of the optical disc 1F. As a result, an optimum recording laser power PL1 is decided for the first recording layer 30 in the optical disc 1F. The optimum recording laser power PL1 is notified from the OPC reproducing processor 8 to the system control circuit 9. The system control circuit 9 stores a signal representative of the optimum recording laser power PL1 into the internal memory 91 as a signal representative of a first-time optimum power ML1. Then, the system control circuit 9 controls the devices and circuits 2, 3, 4, 5, 6, 7, and 8 to perform an OPC procedure which uses the OPC area T2 in the second recording layer 31 of the optical disc 1F. The OPC procedure using the OPC area T2 is similar to that using the OPC area T1. As a result of the OPC procedure using the OPC area T2, an optimum recording laser power PL2 is decided for the second recording layer 31 in the optical disc 1F. The optimum recording laser power PL2 is notified from the OPC reproducing processor 8 to the system control circuit 9. The system control circuit 9 stores a signal representative of the optimum recording laser power PL2 into the internal memory 91 as a signal representative of a first-time optimum power ML2. Thereafter, the system control circuit 9 controls the devices and circuits 2, 3, 4, 5, 6, 7, and 8 to perform an OPC procedure which uses the OPC area T3 in the third recording layer 32 of the optical disc 1F. The OPC procedure using the OPC area T3 is similar to that using the OPC area T1. As a result of the OPC procedure using the OPC area T3, an optimum recording laser power PL3 is decided for the third recording layer 32 in the optical disc 1F. The optimum recording laser power PL3 is notified from the OPC reproducing processor 8 to the system control circuit 9. The system control circuit 9 stores a signal representative of the optimum recording laser power PL3 into the internal memory 91 as a signal representative of a first-time optimum power ML3.

Preferably, at the shipment of the drive apparatus from the factory or at an initial stage of the first-time recording by the drive apparatus of FIG. 1, dummy data is recorded on a portion of the first recording layer 30 which overlaps the margin area C1, the OPC area T2, and the margin area C2 in the second recording layer 31 and the OPC area T3 in the third recording layer 32. Dummy data is also recorded on a portion of the second recording layer 31 which overlaps the OPC area T3 in the third recording layer 32. Therefore, during the OPC procedure using the OPC area T2, the laser beam passes through the dummy-data already-recorded region of the first recording layer 30 before reaching the OPC area T2. During the OPC procedure using the OPC area T3, the laser beam passes through the dummy-data already-recorded regions of the first and second recording layers 30 and 31 before reaching the OPC area T3.

After the optimum recording laser powers PL1, PL2, and PL3 are decided, the system control circuit 9 controls the devices and circuits 2, 3, 4, 5, 6, 7, and 8 to implement first-time recording of information on the data area in the optical disc 1F. During the first-time recording, the system control circuit 9 functions to equalize the power of the laser beam to the optimum recording laser power PL1 when data is recorded on the first recording layer 30 of the optical disc 1F. In addition, the system control circuit 9 functions to equalize the power of the laser beam to the optimum recording laser power PL2 when data is recorded on the second recording layer 31 of the optical disc 1F. Furthermore, the system control circuit 9 functions to equalize the power of the laser beam to the optimum recording laser power PL3 when data is recorded on the third recording layer 32 of the optical disc 1F.

When it is decided that forthcoming recording of information on the optical disc 1F is not the first time one, that is, when it is decided that forthcoming recording is the second or later time one, the system control circuit 9 controls the devices and circuits 2, 3, 4, 5, 6, 7, and 8 to perform the OPC procedure which uses the OPC area T1 in the first recording layer 30 of the optical disc 1F. As a result, a new optimum recording laser power PL1 is decided for the first recording layer 30 in the optical disc 1F. The new optimum recording laser power PL1 is notified from the OPC reproducing processor 8 to the system control circuit 9. The system control circuit 9 stores a signal representative of the new optimum recording laser power PL1 into the internal memory 91. Subsequently, the system control circuit 9 reads out the signals representative of the first-time optimum powers ML1, ML2, and ML3 from the memory 91. Then, the system control circuit 9 calculates a new optimum recording laser power PL2 for the second recording layer 31 in the optical disc 1F from the new optimum recording laser power PL1 and the first-time optimum powers ML1 and ML2 according to the previously-indicated equation (1). In addition, the system control circuit 9 calculates a new optimum recording laser power PL3 for the third recording layer 32 in the optical disc 1F from the new optimum recording laser power PL1 and the first-time optimum powers ML1 and ML3 according to the following equation.

$$PL3 = PL1 \cdot ML3/ML1 \qquad (2)$$

Thereafter, the system control circuit 9 controls the devices and circuits 2, 3, 4, 5, 6, 7, and 8 to implement the recording of data (information) on the first, second, and third recording layers 30, 31, and 32 in the data area. Furthermore, the system control circuit 9 operates so that the power of the laser beam will be equal to the new optimum recording laser power PL1 during the recording of data on the first recording layer 30 in the data area, will be equal to the new optimum recording laser power PL2 during the recording of data on the second recording layer 31 in the data area, and will be equal to the new optimum recording laser power PL3 during the recording of data on the third recording layer 32 in the data area.

As previously mentioned, in the case where forthcoming recording of information on the optical disc 1F is the second or later time one, new optimum recording laser powers PL2 and PL3 for the second and third recording layers 31 and 32 of the optical disc 1F are decided without carrying out the OPC procedures using the OPC areas T2 and T3 in the second and third recording layers 31 and 32. Therefore, it is possible to promptly start the recording of data (information) on the second and third recording layers 31 and 32 in the data area. Furthermore, the single-time implementation of the OPC procedure using the OPC area T2 and the OPC procedure using the OPC area T3 suffices.

As previously mentioned, the OPC procedures using the OPC areas T2 and T3 in the second and third recording layers 31 and 32 are carried out only when forthcoming recording of information on the optical disc 1F is the first time one. Therefore, the OPC areas T2 and T3 can be small in size. The smaller sizes of the OPC areas T2 and T3 allow a greater size of the OPC area T1 in the first recording layer 30. As the OPC area T1 is greater, the OPC procedure using the OPC area T1 can be implemented more times.

Eighth Embodiment

An eighth embodiment of this invention is similar to the seventh embodiment thereof except for design changes described hereafter. The eighth embodiment of this invention uses an optical disc 1G instead of the optical disc 1F (see FIG. 13).

Figure 14:
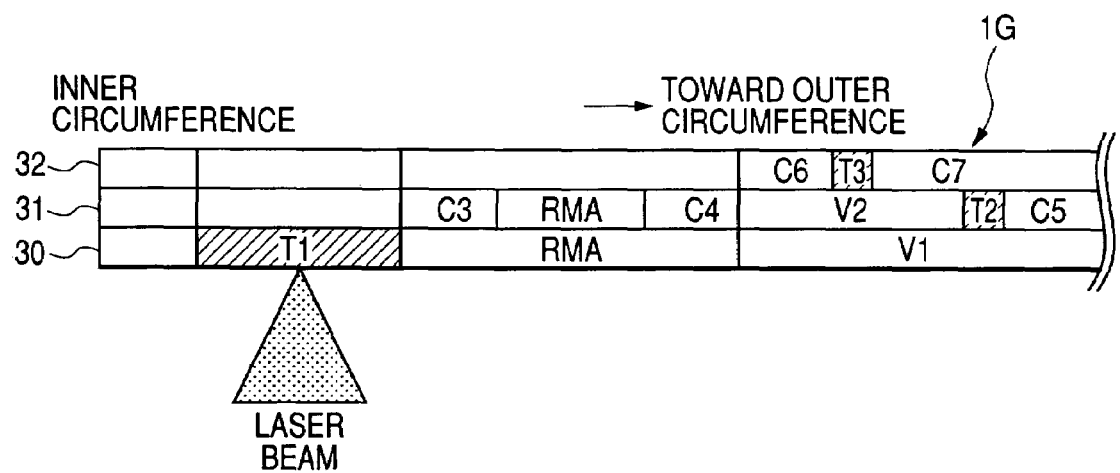
FIG. 14 is a sectional diagram of a portion of an optical disc in an eighth embodiment of this invention.

With reference to FIG. 14, the optical disc 1G is of a three-layer single-sided structure. A BCA is omitted from a first recording layer 30 in a management area of the optical disc 1G. In the management area, an OPC area T1 is provided in a portion of the first recording layer 30 which extends radially inward of the RMA. A portion (a BCA corresponding portion) of the first recording layer 20 which extends radially outward of the RMA is defined as an unoccupied area V1. An unoccupied area V2, an OPC area T2, and a margin area C5 are provided in a portion of the second recording layer 31 which extends radially outward of the margin area C4 and the RMA. The unoccupied area V2 is located between the margin area C4 and the OPC area T2. The margin area C5 is located radially outward of the OPC area T2. The unoccupied area V1 overlaps the unoccupied area V2, the OPC area T2, and the margin area C5 as viewed in the thickness-wise direction of the optical disc 1G. A margin area C6, an OPC area T3, and a margin area C7 are provided in a portion of the third recording layer 32 which extends radially outward of the margin area C4 and the RMA. The OPC area T3 is sandwiched between the margin areas C6 and C7. The unoccupied area V2 fully covers the OPC area T3 as viewed in the axially forward direction of the laser beam (the thickness-wise direction of the optical disc 1G).

It is preferable that at the shipment of the drive apparatus from the factory or at an initial stage of the first-time recording by the drive apparatus, dummy data is recorded on the unoccupied area V1 in the first recording layer 30 and the unoccupied area V2 in the second recording layer 31. In this case, during the OPC procedure using the OPC area T2, the laser beam passes through the dummy-data already-recorded region V1 of the first recording layer 30 before reaching the OPC area T2. These conditions of the laser beam are similar or equivalent to those occurring in the case where the laser beam passes through a data-already-recorded region of the first recording layer 30 in the data area before reaching the second recording layer 31 in the data area to record data (information) thereon. Accordingly, an optimum recording laser power PL2 and a first-time optimum power ML2 decided as a result of the OPC procedure using the OPC area T2 are accurate and reliable for the recording of data (information) on the second recording layer 31 in the data area. Similarly, during the OPC procedure using the OPC area T3, the laser beam passes through the dummy-data already-recorded regions V1 and V2 of the first and second recording layers 30 and 31 before reaching the OPC area T3. These conditions of the laser beam are similar or equivalent to those occurring in the case where the laser beam passes through data-already-recorded regions of the first and second recording layers 30 and 31 in the data area before reaching the third recording layer 32 in the data area to record data (information) thereon. Accordingly, an optimum recording laser power PL3 and a first-time optimum power ML3 decided as a result of the OPC procedure using the OPC area T3 are accurate and reliable for the recording of data (information) on the third recording layer 32 in the data area.

The OPC area T1 in the first recording layer 30 extends adjacently radially inward of the RMA. The OPC area T1 is relatively great in size. Accordingly, a possible number of times of the implementation of the OPC procedure using the OPC area T1 is remarkably large.

It should be noted that the positions of the OPC areas T1, T2, and T3 may be changed as follows. The OPC areas T1 is located radially outward of the RMA while the OPC areas T2 and T3 are located radially inward of the RMA.

Ninth Embodiment

A ninth embodiment of this invention is similar to one of the first to eighth embodiments thereof except that an optical disc has four or more recording layers at its one side.

Tenth Embodiment

A tenth embodiment of this invention is similar to one of the first to eighth embodiments thereof except that an optical disc has two recording layers at each of its two sides.

Eleventh Embodiment

An eleventh embodiment of this invention is similar to one of the first to tenth embodiments thereof except for an additional design described hereafter. In the eleventh embodiment of this invention, the system control circuit 9 (see FIG. 1) controls the devices and circuits 2, 3, 4, 5, 6, 7, and 8 so that signals representing the decided optimum recording laser powers for the respective recording layers of the optical disc will be recorded on each of the recording layers in the RMA. By reading out information from the first recording layer in the RMA, the drive apparatus can detect the optimum recording laser powers for the respective recording layers at one time.

What is claimed is:

1. An apparatus for driving an optical disc having at least two recording layers which can be optically accessed by a laser beam from one side of the disc, and which are laminated in a forward direction of the laser beam, the recording layers having trial write areas respectively and including first and second recording layers, the apparatus comprising:
   an optical head for generating the laser beam and applying the generated laser beam to the optical disc;
   first means for deciding whether or not forthcoming recording of an information signal on the optical disc is first time;
   second means for recording test signals on the trial write areas in the first and second recording layers by use of the optical head and the laser beam with varying powers, and reproducing the recorded test signals from the trial write areas in cases where the first means decides that forthcoming recording of information on the optical disc is first time;

third means for obtaining first information representing first-time optimum recording powers of the laser beam for the respective first and second recording layers in response to the test signals reproduced by the second means;

fourth means for recording the test signals on the trial write area in the first recording layer by use of the optical head and the laser beam with varying powers, and reproducing the recorded test signals from the trial write area in the first recording layer in cases where the first means decides that forthcoming recording of an information signal on the optical disc is not first time;

fifth means for obtaining second information representing a new optimum recording power of the laser beam for the first recording layer in response to the test signals reproduced by the fourth means; and sixth means for obtaining third information representing a new optimum recording power of the laser beam for the second recording layer from (1) the new optimum recording power for the first recording layer which is represented by the second information obtained by the fifth means and (2) a ratio between the first-time optimum recording powers for the first and second recording layers which are represented by the first information obtained by the third means.

2. An apparatus as recited in claim 1, wherein the second means implements the recording of the test signals on the trial write areas in a manner such that positions of the recorded test signals the trial write areas are out of overlap as viewed along the forward direction of the laser beam.

3. An apparatus as recited in claim 1, further comprising means for recording dummy data on a portion of the first recording layer which overlaps the trial write area in the second recording layer as viewed along the forward direction of the laser beam before the second means implements the recording of the test signals.

4. A method of deciding optimum recording powers of a laser beam applied from an optical head to an optical disc having at least two recording layers which can be optically accessed by the laser beam from one side of the disc, and which are laminated in a forward direction of the laser beam, the recording layers having trial write areas respectively and including first and second recording layers, the method comprising the steps of:

a) deciding whether or not forthcoming recording of an information signal on the optical disc is first time;

b) recording test signals on the trial write areas in the first and second recording layers by use of the optical head and the laser beam with varying powers, and reproducing the recorded test signals from the trial write areas in cases where the step a) decides that forthcoming recording of an information signal, on the optical disc is first time;

c) obtaining first information representing first-time optimum recording powers of the laser beam for the respective first and second recording layers in response to1 the test signals reproduced by the step b);

d) recording the test signals on the trial write area in the first recording layer by use of the optical head and the laser beam with varying powers, and reproducing the recorded test signals from the trial write area in the first recording layer in cases where the step a) decides that forthcoming recording of an information signal on the optical disc is not first time;

e) obtaining second information representing a new optimum recording power of the laser beam for the first recording layer in response to the test signals reproduced by the step d); and f) obtaining third information representing a new optimum recording power of the laser beam for the second recording layer from (1) the new optimum recording power for the first recording layer which is represented by the second information obtained by the step e) and (2) a ratio between the first-time optimum recording powers for the first and second recording layers which are represented by the first information obtained by the step c).

5. A method as recited in claim 4, further comprising the step of recording dummy data on a portion of the first recording layer which overlaps the trial write area in the second recording layer as viewed along the forward direction of the laser beam before the step b) implements the recording of the test signals.

6. A method as recited in claim 4, wherein the step b) implements the recording of the test signals on the trial write areas in a manner such that positions of the recorded test signals in the trial write areas are out of overlap as viewed along the forward direction of the laser beam.

* * * * *